United States Patent
Angell et al.

(10) Patent No.: US 8,004,414 B2
(45) Date of Patent: Aug. 23, 2011

(54) USE OF RFIDS TO MEASURE FLOW-RATES OF MATERIALS FLOWING THROUGH PIPING

(75) Inventors: Robert L. Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 12/049,099

(22) Filed: Mar. 14, 2008

(65) Prior Publication Data

US 2009/0231149 A1 Sep. 17, 2009

(51) Int. Cl.
 *G08B 21/00* (2006.01)
 *H04Q 5/22* (2006.01)
 *G01F 1/708* (2006.01)

(52) U.S. Cl. ..... 340/606; 340/609; 340/10.1; 73/861.05
(58) Field of Classification Search ............. 340/606, 340/609, 10.1; 73/861.05
See application file for complete search history.

(56) References Cited

U.S. PATENT DOCUMENTS

| 4,827,395 | A  | * | 5/1989  | Anders et al. ............ 700/9 |
| 7,452,444 | B2 | * | 11/2008 | Lawrence et al. ......... 162/49 |
| 7,669,484 | B2 | * | 3/2010  | Slater et al. ......... 73/861.49 |
| 2002/0130780 | A1 | * | 9/2002 | McQueen et al. ......... 340/603 |
| 2006/0243643 | A1 | * | 11/2006 | Scott et al. ............ 209/309 |

* cited by examiner

*Primary Examiner* — Jennifer Mehmood
*Assistant Examiner* — Mark Rushing
(74) *Attorney, Agent, or Firm* — Dillon & Yudell LLP

(57) ABSTRACT

Material passing through a piping is laced with Radio Frequency Identification (RFID) tags. As the RFID tags pass an RFID sensor, which is either adjacent to or within the piping, a flow-rate of the material is determined by counting the rate at which the RFID tags pass the RFID sensor.

13 Claims, 5 Drawing Sheets

US 8,004,414 B2

USE OF RFIDS TO MEASURE FLOW-RATES OF MATERIALS FLOWING THROUGH PIPING

BACKGROUND OF THE INVENTION

1. Technical Field

The present disclosure relates to the field of processing and manufacturing operations, and specifically to operations that move materials through piping. Still more particularly, the present disclosure relates to electronically detecting a flow-rate of material through piping.

2. Description of the Related Art

Chemical processing plants, refineries, manufacturing plants and similar facilities often use feed stock (used in chemical processing plants and refineries), raw material (used in manufacturing plants), and/or substrates (used in chemical processing plants as well as in the manufacture of electronics such as ICs) in their operations. Such materials may be dangerous, and may include organic and inorganic chemicals, solvents, reagents, etc.; metals/metalloids such as arsenic and gallium; heavy metals such as lead; etc. Such dangerous material may pose safety hazards (e.g., are flammable), or they may pose health hazards (e.g., are cancer-causing carcinogens, death or organ damage-inducing toxins, birth defect-causing teratogens, etc.) to employees, visitors and/or neighbors. Typically, such dangerous materials are moved throughout a facility via piping.

SUMMARY OF THE INVENTION

Material passing through a piping is laced with Radio Frequency Identification (RFID) tags. As the RFID tags pass an RFID sensor, which is either adjacent to or within the piping, a flow-rate of the material is determined by counting the rate at which the RFID tags pass the RFID sensor.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
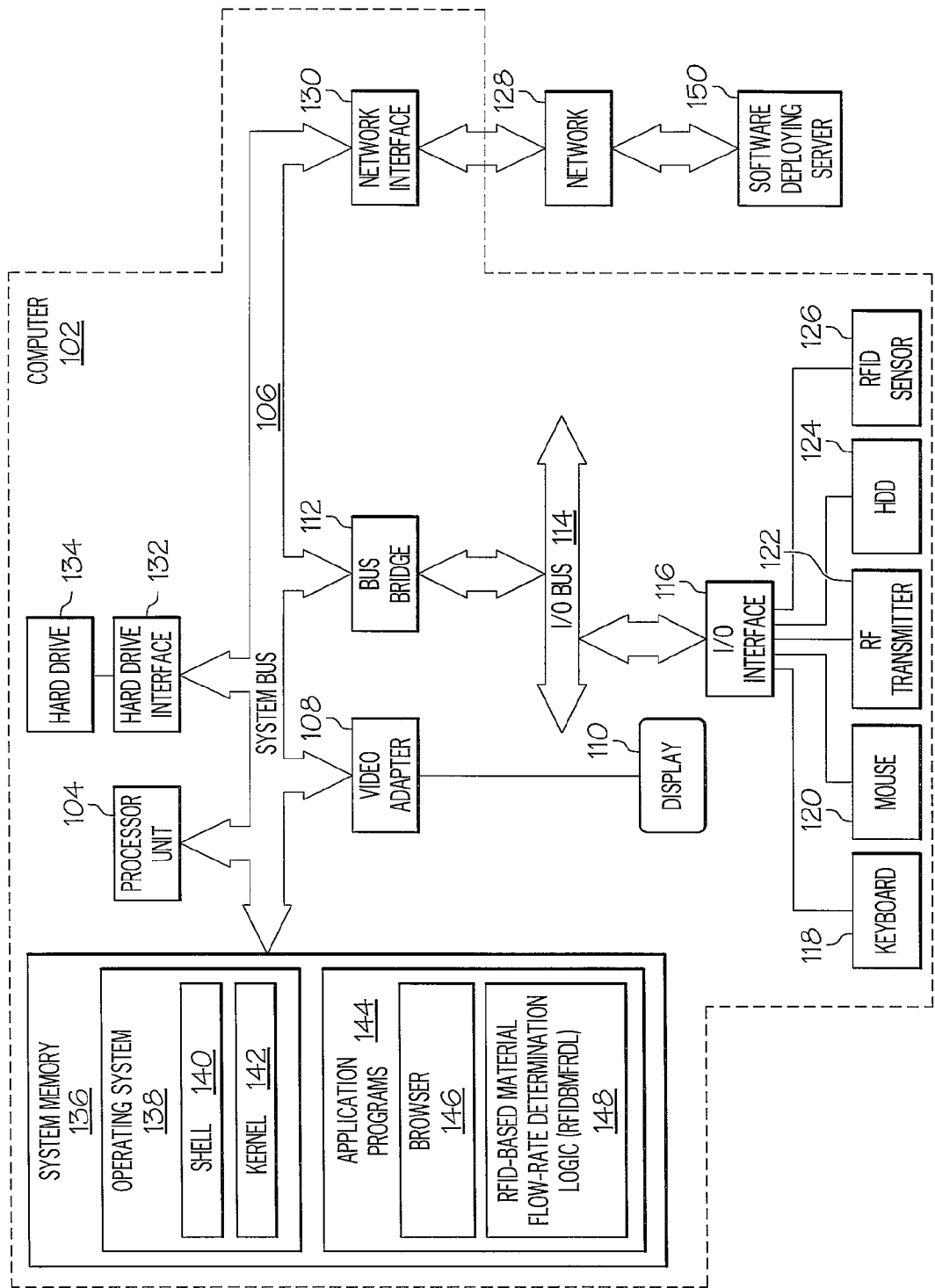
FIG. 1 depicts an exemplary computer in which the present invention may be utilized.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Radio Frequency (RF) transmitter 122, a Hard Disk Drive (HDD) 124, and a Radio Frequency Identification (RFID) sensor 126. It is recognized that RF transmitter 122 and RFID sensor 126 should be protected from one another, by physical separation distance or a shield (not shown), in order to enable proper functionality of the RFID sensor 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a RFID-Based Material Flow-Rate Determination Logic (RFIDBMFRDL) 148. RFIDBMFRDL 148 includes code for implementing the processes described below, and particularly as described in reference to FIGS. 4-8. In one embodiment, computer 102 is able to download RFIDBMFRDL 148 from software deploying server 150, including in an on-demand basis. Note further that, in one embodiment of the present invention, software deploying server 150 performs all of the functions associated with the present invention (including execution of RFIDBMFRDL 148), thus freeing computer 102 from having to use its own internal computing resources to execute RFIDBMFRDL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

The present invention uses RFID tags that store and communicate Electronic Product Code (EPC) information. The RFID tags may be active (i.e., battery powered), semi-passive (i.e., powered by a battery and a capacitor that is charged by an RF interrogation signal), or purely passive (i.e., either have a capacitor that is charged by an RF interrogation signal or are geometrically shaped to reflect back specific portions of the RF interrogation signal). However, due their smaller size which allows for a free-flowing material to maintain a uniform distribution of the RFID tags, and to avoid clogging up piping, RFID tags used by the present invention are preferably passive RFID tags. These passive RFID tags may contain an on-board Integrated Circuit (IC) chip, or they may be chipless.

Figure 2:
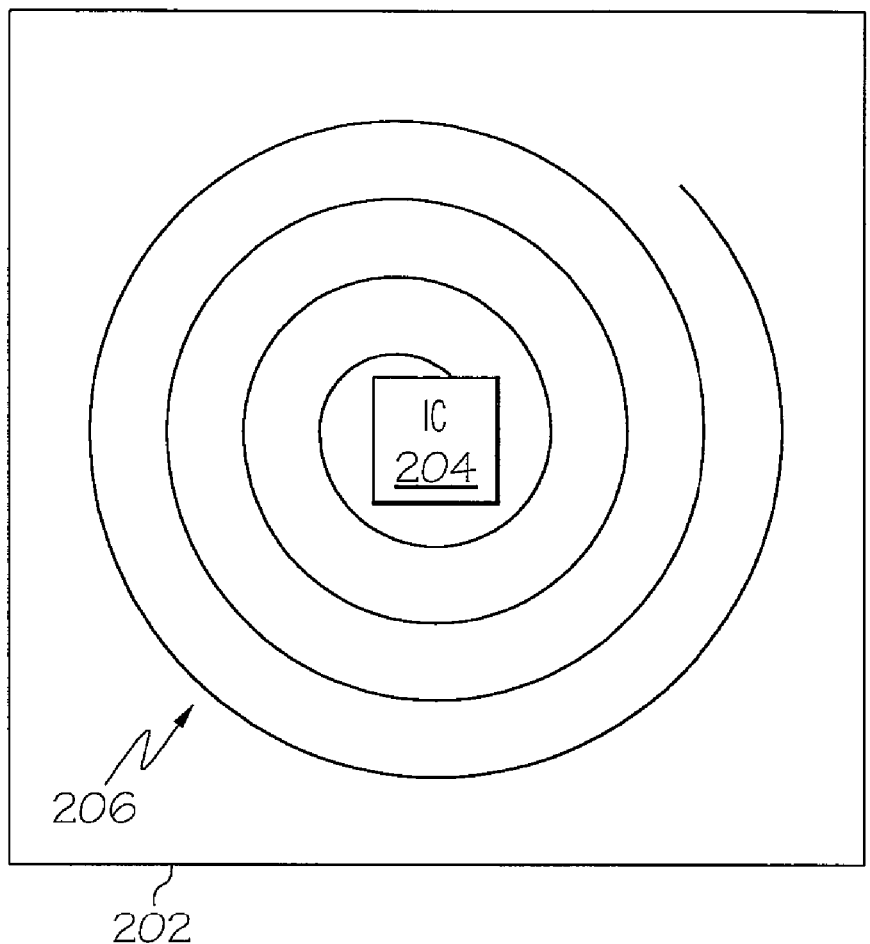
FIG. 2 illustrates an exemplary chip-enabled Radio Frequency Identification (RFID) tag that may be used by the present invention.

FIG. 2 depicts an exemplary chip-enabled RFID tag 202, which is a passive RFID tag that has an on-board IC chip 204 and a coupled antenna 206. The IC chip 204 stores and processes information, including EPC information that describes information (including name, chemical composition, manufacturer, lot number, etc.) of material (as described below). The IC chip 204 may contain a low-power source (e.g., a capacitor, not shown, that is charged by an interrogation signal received by the coupled antenna 206). Upon the capacitor being charged, the RFID tag 202 then generates a radio signal, which includes the EPC information stored in the IC chip 204, to be broadcast by the coupled antenna 206.

Figure 3:
FIG. 3 depicts an exemplary chipless RFID tag that may be used by the present invention.

FIG. 3 illustrates an exemplary chipless RFID tag 302. As the name implies, chipless RFID tag 302 does not have an IC chip, but is only an antenna that is shaped to reflect back a portion of an interrogation signal. That is, the chipless RFID tag 302 (also known as a Radio Frequency (RF) fiber) is physically shaped to reflect back select portions of a radio interrogation signal from an RF transmission source. Chipless RFID tag 302 typically has a much shorter range than that of chip-enabled RFID tag 202. Furthermore, the amount of information that chipless RFID tag 302 can return is much smaller than that of chip-enabled RFID tag 202, which is able to store relatively large amounts of data in the on-board IC chip 204.

Figure 4:
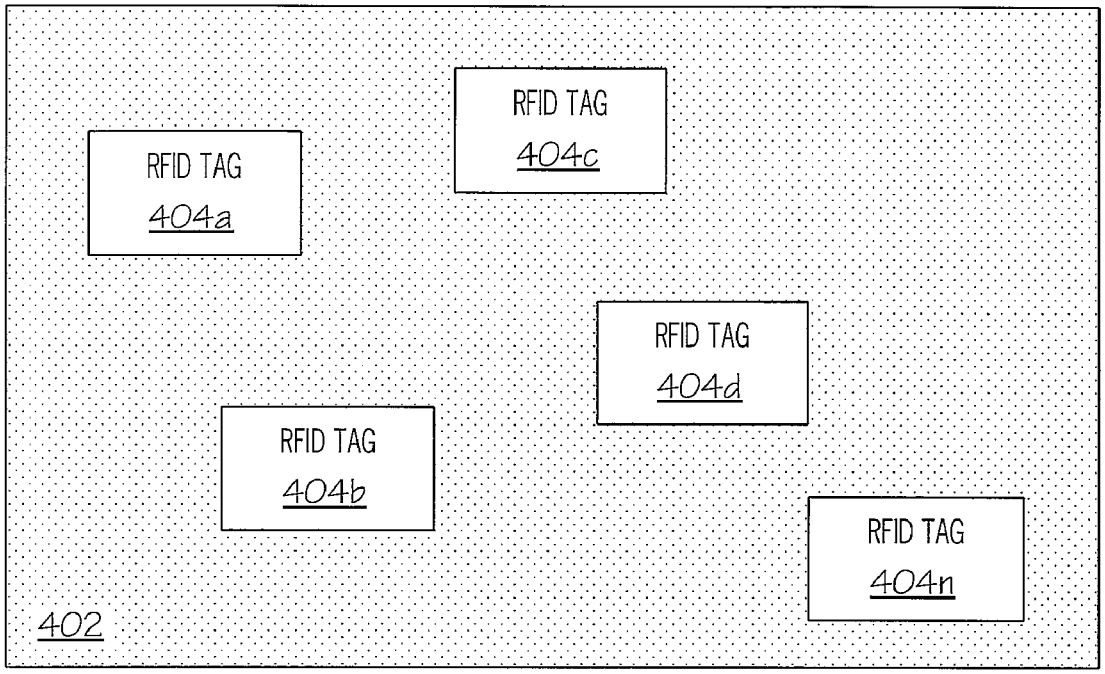
FIG. 4 illustrates an exemplary laced material that is laced with a single type of RFID tags.

Referring now to FIG. 4, consider a laced material 402 that is laced with a first set of multiple RFID tags 404a-n (where "n" is an integer). One or more of the RFID tags 404a-n may be chip-enabled (e.g., the chip-enabled RFID tag 202 described above in FIG. 2), and one or more of the RFID tags 404a-n may be chipless (e.g., chipless RFID tag 302 described above in FIG. 3). Note that the RFID tags 404a-n are uniformly distributed throughout the laced material 402. This distribution is caused by 1) proper mixing of the RFID tags 404a-n into the laced material 402, and 2) the RFID tags 404a-n having physical properties that enable them to remain uniformly distributed, even when being transported through a piping. These physical properties include, but are not limited to, 1) a small physical dimension of each of the RFID tags 404a-n, and 2) an optional coating (not shown) that gives each of the RFID tags 404a-n a same specific gravity (i.e., density) as bulk material in laced material 402, etc. By being uniformly distributed throughout the laced material 402, the RFID tags 404a-n provide flow-rate (e.g., speed) markers for determining how fast the laced material 402 is flowing through a piping.

Note that in one embodiment, the multiple RFID tags 404a-n are not adhered to the laced material 402 (as shown in FIG. 4), but rather are suspended within laced material 402 in a colloidal state. Note also that the RFID tags 404a-n are not shown to scale. That is, the RFID tags 404a-n are preferably small (i.e., less than 0.5 mm×0.5 mm), in order to allow them to flow freely and without clogging piping through which the laced material 402 flows.

Again, note that, as described above in one embodiment, the RFID tags 404a-n remain uniformly mixed throughout the laced material 402. If the laced material 402 is a dry particulate matter (e.g., powder, sand, pellets, etc.), then the RFID tags 404a-n will naturally remain in a uniformly dispersed orientation. If the laced material 402 is a liquid, however, then a coating (not shown) may need to be applied around each of the RFID tags 404a-n, in order to give them a same specific gravity as the laced material 402. This coating should have properties that do not act as a Faraday shield (which would prevent electronic interrogation of the RFID tags 404a-n) around the RFID tags 404a-n. The features described here for RFID tags 404a-n also apply in an exemplary embodiment for RFID tags 504a-n.

Figure 5:
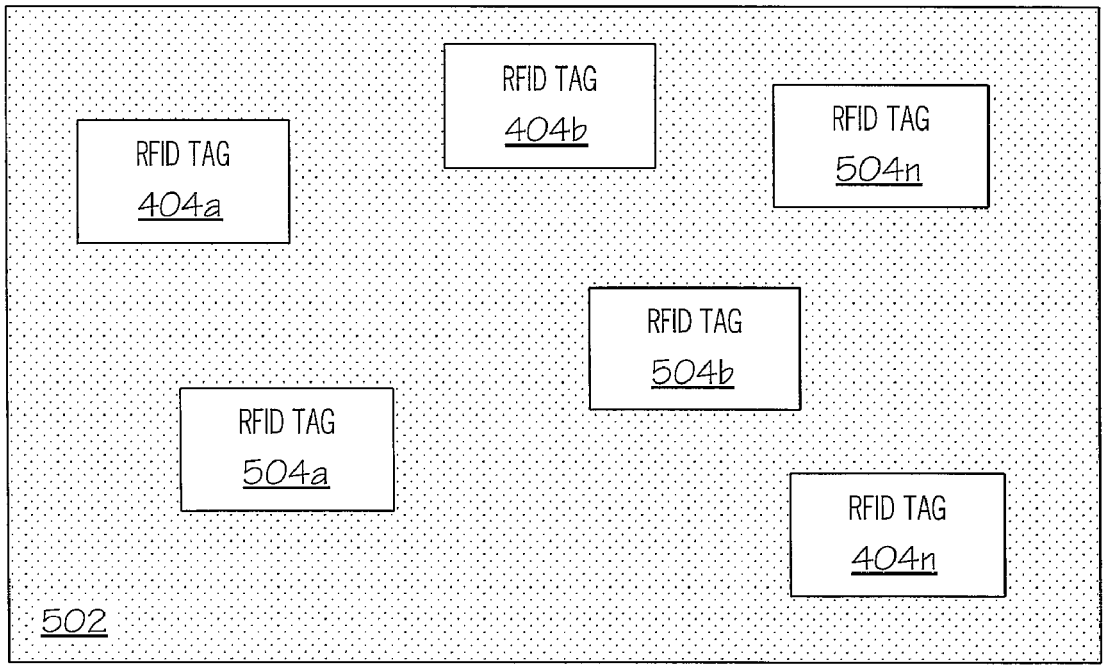
FIG. 5 depicts an exemplary laced compound material that is laced with different types of RFID tags for each component of the compound material.

Referring now to FIG. 5, differently configured RFID tags can be laced within a laced compound material 502. That is, assume that the laced compound material 502 is made up of a component "A" and a component "B." By associating component "A" with RFID tags 404a-n, and by associating component "B" with RFID tags 504a-n, then if there is material shearing between the two components, the different RFID tags can track the relative flow-rates of the two components. This assumes, of course, that the two components "A" and "B" do not mix together as an emulsion, but rather maintain their separation within the piping.

Returning again to FIG. 4, laced material 402 may be a liquid, a slurry, a colloid, a particulate solid (e.g., a powder, sand, etc.), etc. Assume that the laced material is being used in a facility, such as facility 604 shown in FIG. 6. Examples of facility 604 include, but are not limited to, manufacturing plants, chemical plants, petroleum refineries, power plants, etc. Examples of laced material 602 (shown in FIG. 6, and which may be laced material 402 and/or laced compound material 502 describe above) are likewise numerous. For example, if facility 604 is a chemical plant, laced material 602 could be raw liquid chemical feed stock. If facility 604 is a plastics manufacturing plant, then laced material 602 could be raw plastic pellets. If facility 604 is a nuclear power plant, then the laced material 602 could be cooling water for a nuclear reactor (not shown). If facility 604 is a machine shop, the laced material 602 could be lubrication oil for rotating equipment (e.g., lathes). These examples are for illustrative purposes only, and are not to be construed as exhaustive descriptions of laced materials 602 or facilities 604. All scenarios described utilize the current concept of tracking unbound Radio Frequency Identification (RFID) tags as they move through piping in order to determine how fast material is flowing through the piping (and optionally, what that material is made of).

Figure 6:
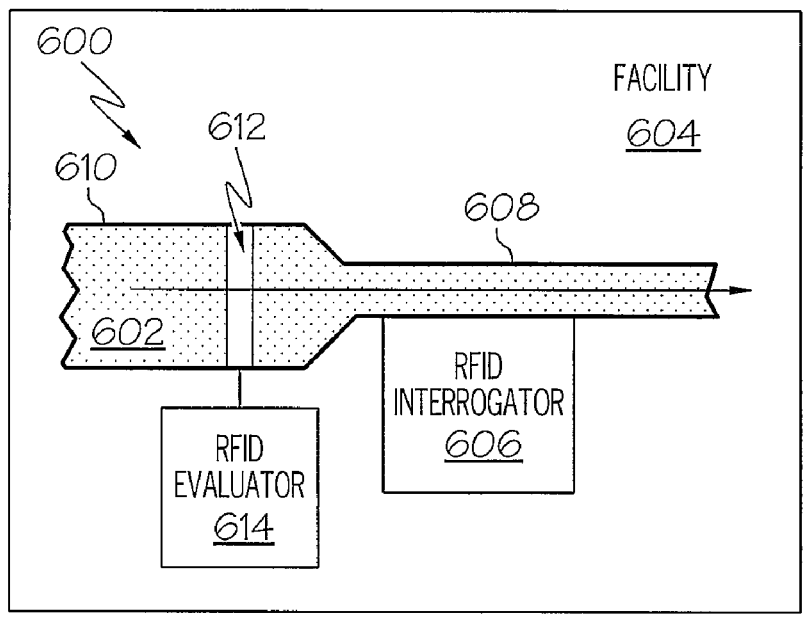
FIG. 6 illustrates exemplary equipment that can be used to detect RFID tags that are embedded in laced material flowing though a piping, in order to determine the flow-rate of the material through the piping.
Figure 7:
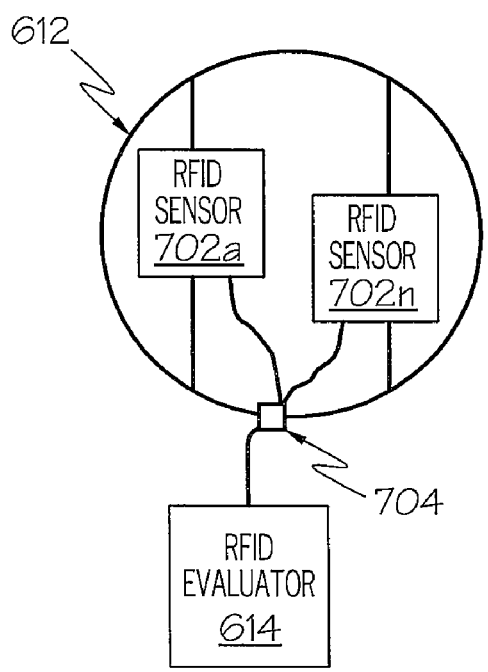
FIG. 7 depicts additional detail of a sensor grid that is internal to the piping shown in FIG. 6.

Referring then to FIG. 6, as the laced material 602 passes though piping 600 in a facility 604, the RFID tags (e.g., RFID tags 404$a$-$n$ and/or RFID tags 504$a$-$n$, but not shown in FIG. 6) are counted by an RFID interrogator 606. REID interrogator 606 utilizes an architecture substantially described in FIG. 1 for computer 102. That is, RFID interrogator 606 includes at least one RFID sensor 126, which interrogates and counts the passing RFID tags as they flow through the piping 600. This interrogation/counting is accomplished by transmitting an RF interrogation signal from an RF transmitter 122 (shown in FIG. 1) to the RFID tags, which then respond with ID data (specific for the material 602 in one embodiment) for the material 602. By counting how many RFID tags pass by the RFID interrogator 606 per unit of time, a flow-rate of the material 602 passing through the piping 600, and particularly the flow-rate through narrowed piping section 608 of the piping 600, can be calculated as described below.

With reference still to FIG. 6, consider a scenario in which the narrowed piping section 608 is still so large (even after being tapered down from the piping section 610) that RFID tags in the middle of the narrowed piping section 608 are unable to be "heard" by the RFID interrogator 606. For example, assume that, after including any RF shielding properties of the piping 600 and/or the laced material 602 itself, some of the RFID tags cannot be detected by the RFID interrogator 606, due to the distance from the RFID interrogator 606 to the central axis of the narrowed piping section 608. In this case, a grid 612 may be used with an RFID evaluator 614. Grid 612 is a (rigid, semi-rigid or flexible) grid that is mounted within piping 600 in a traverse manner (i.e., where the face of the grid 612 is perpendicular to the flow of the laced material 602). The grid 612 is preferably made of material that is both impervious (non-reactive, non-corrosive, etc.) to the laced material 602, and also poses no electrical interference (including RF shielding) to the RFID tags that lace the laced material 602, as described above for laced materials 402 and 502 shown in FIGS. 4 and 5. Mounted on the grid 612 are multiple RFID sensors 702$a$-$n$ (shown in FIG. 7, where "n" is an integer), which are coupled via a sealed coupler 704 (that permits power and data communication to flow between the RFID sensors 702$a$-$n$ and the RFID evaluator 614 without allowing the material 602 to escape the piping 600). The RFID evaluator 614 is substantially similar to the architecture shown in FIG. 1 for computer 102, except that the RFID sensors 702$a$-$n$ (analogous to RFID sensor 126 shown in FIG. 1) are external to the computer 102.

Figure 8:
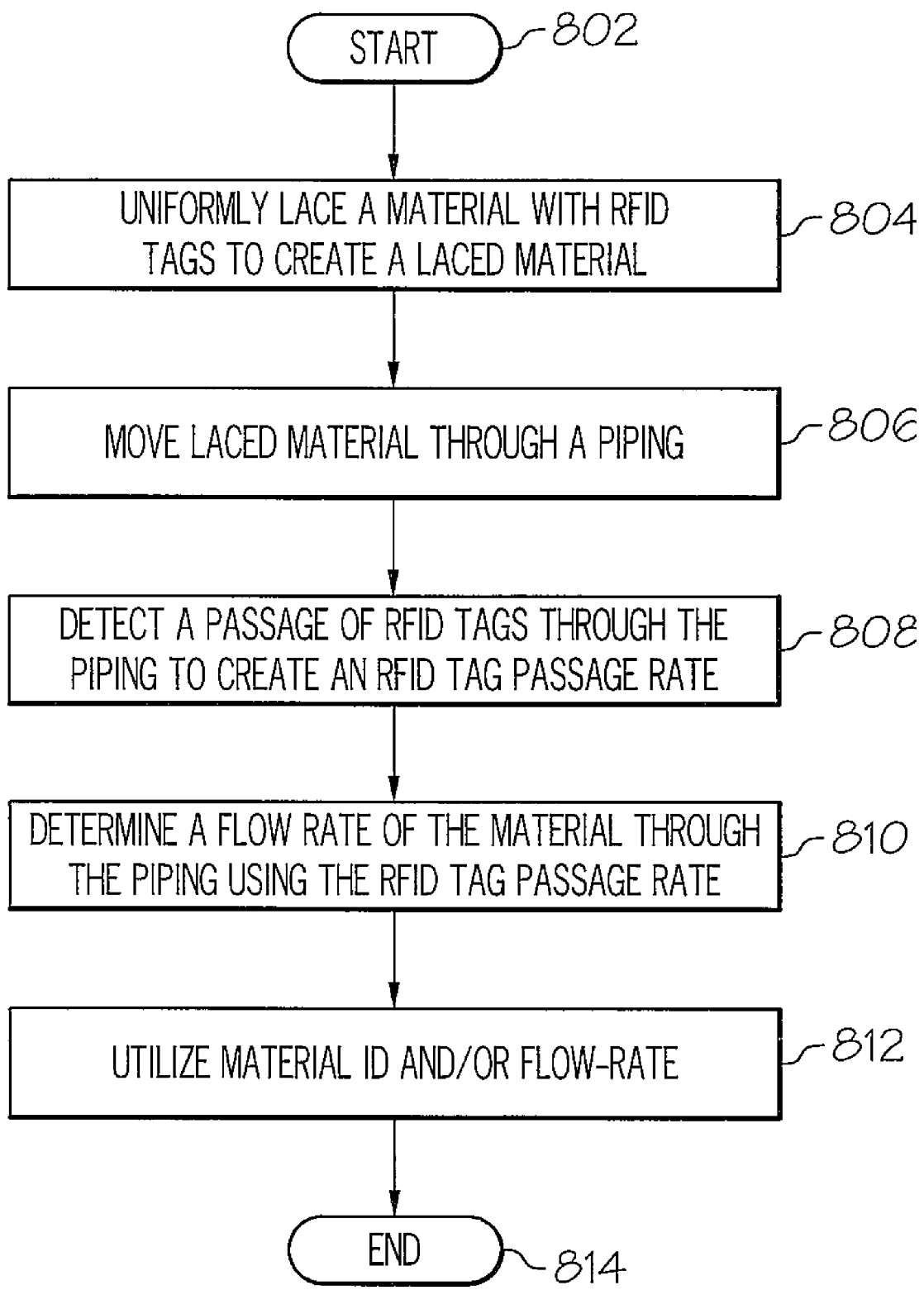
FIG. 8 is a high-level flow-chart of exemplary steps taken to utilize RFID tags to determine how fast a material is flowing through piping.

With reference now to FIG. 8, a high-level flow-chart of exemplary steps taken to determine flow-rates of materials passing through a piping (including a sealed closed piping) is presented. After initiator block 802, a material is laced with multiple RFID tags (block 804). Again, note that these multiple RFID tags are embedded in, but not adhered to, the material, which may be a liquid, a solution, a colloid, particulates, or any other free-flowing material. As the material passes through piping in a facility (block 806), the embedded RFID tags are detected and counted per unit of time (block 808) to establish an RFID tag passage rate (e.g., twenty RFID tags pass by and are counted in ten seconds).

A flow rate of the material can then be calculated based on the RFID tag passage rate per unit of time (block 810). For example, assume that twenty RFID tags are known to be uniformly distributed throughout each liter of material in the piping, and that in a span of ten seconds, twenty RFID tags are detected as they pass near an RFID interrogator that is beside or within the piping. The flow-rate of the material in the piping is therefore calculated as being one liter per ten seconds, or six liters per minute.

Alternatively, a speed and direction of an RFID tag can be measured to determine if there is any turbulence within the piping. For example, assume that each RFID tag in the material has a unique identifier. If a same RFID tag is detected more than once during a specific time period (e.g., five seconds), while another RFID tag is only counted once, then a conclusion can be reached that there is internal fluid turbulence within the piping.

Alternatively, a same set of RFID tags can be monitored for a first period of time and a second period of time. If the RFID tag counts for the two periods of time differ, then a conclusion can be drawn that there is turbulence within the piping, since the material is not flowing through the piping at a steady speed.

Similarly, the movement of RFID tags for different fluids within the piping can indicate fluid shearing. For example, assume that a first material is laced with a first set of RFID tags, a second material is laced with a second set of RFID tags, and the two materials do not intermix into an emulsion due to different specific gravities (densities). Thus, a lightweight oil may be traveling through a top section of the piping, while water may be flowing through a bottom section of the piping. If the lightweight oil and the water flow at different speeds, and different quantities of the different RFID tags are detected in the same period of time, then (assuming that the two materials are laced with RFID tags in a same concentration) a conclusion can be drawn that the two fluids are traveling through the piping at different speeds (due to fluid shearing).

Another type of fluid shearing can occur if a first material tends to adhere to the inner walls of the piping, while a second material tends to travel through the center of the piping (without mixing with the first material). By measuring the different speed at which two different sets of RFID tags for first material and the second material are moving, and by detected the positions of the two set of RFID tags within the piping, then a conclusion can be drawn that 1) there is fluid shearing caused by 2) material adhesion by the first material against the inner wall of the piping.

As depicted in block 812, the identity and flow-rate of the material is then utilized. The speed at which the material passes through piping, as well as the identification of the material, can be utilized for many different purposes. For example, assume that the RFID tags identify the type of material flowing through a closed piping. Detecting and identifying the RFID tags allows a safe way to identify what material is flowing through the piping, and at what speed. This eliminates the need to break open a piping (using valves, blinds, "hot taps" into the piping, etc.) to identify what material is inside the piping.

Similarly, the present invention may be used to confirm that material flowing into a processing unit is moving at the proper speed. An example of such material could be cooling liquid for a reactor. If the cooling liquid is not flowing fast enough, then the reactor may overheat. If the cooling liquid is flowing too fast, then the reactor may fail to operate properly.

These examples are for exemplary purposes only, and are not to be construed as limiting the scenarios in which the present invention (comprising the use of RFID tags to identify and/or monitor flow-rates of materials in a piping) may be useful.

The process ends at terminator block 814.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Note that while the present invention has been described for material flowing through a closed piping, the concepts described herein for determining material flow rates using RFID tags may also be applied to open piping, including but not limited to, aqueducts, streams, canals, half-pipes, etc. Therefore, unless expressly stated otherwise, the term "piping" in the claims is to be construed as including any type of conduit, either closed or open, for transporting material, either liquid or solid.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of determining a flow-rate of material passing through a piping, the method comprising:
    passing a first laced material through a piping, wherein the first laced material is a first material that is uniformly laced with a first set of multiple Radio Frequency Identification (RFID) tags that are suspended, in a colloidal state, in the first material, and wherein the first set of RFID tags is distributed in a first known concentration in the first laced material;
    detecting and counting first RFID tags, from the first set of multiple RFID tags, as the first RFID tags pass through the piping to generate a first RFID tag passage rate, wherein the first RFID tag passage rate is based on a first quantity of first RFID tags, from the first set of multiple RFID tags, that pass a specific location on the closed piping per a unit of time, and wherein the first RFID tags are detected and counted by positioning at least one RFID sensor adjacent to the piping, where the first RFID tags have a limited detection range that is less than a cross-sectional radius of a first section of the piping, and where a second section of the piping has a smaller cross-sectional radius in order to permit detection of the first RFID tags by positioning said at least one RFID sensor proximate to an exterior surface of the second section of the piping; and
    determining a flow rate of the first laced material through the piping based on the first RFID tag passage rate and the first known concentration of first RFID tags in the first laced material.

2. The method of claim 1, wherein the first laced material is composed of dry particulates.

3. The method of claim 1, wherein the first laced material is an emulsion of two unblended substances.

4. The method of claim 1, wherein the first laced material is a liquid.

5. The method of claim 1, wherein the piping is a closed piping, and wherein the first laced material remains within the closed piping while the first RFID tags are detected and counted.

6. The method of claim 5, wherein the first laced material is a hazardous material.

7. The method of claim 1, wherein the first set of RFID tags identify the first laced material.

8. A method of enabling a determination of a flow-rate of material passing through a piping, the method comprising:
    lacing a material with multiple Radio Frequency Identification (RFID) tags in a uniform, suspended colloidal state to create a laced material, wherein the RFID tags are distributed throughout the laced material in a known concentration;
    detecting and counting RFID tags, from the multiple RFID tags, as the laced material including the RFID tags pass through a closed piping to generate an RFID tag passage rate, wherein the RFID tag passage rate is based on a quantity of RFID tags, from the multiple RFID tags, that pass a specific location on the closed piping per a unit of time, and wherein the RFID tags are detected and counted by positioning at least one RFID sensor adjacent to the closed piping, where the RFID tags have a limited detection range that is less than a cross-sectional radius of a first section of the closed piping, and where a second section of the closed piping has a smaller cross-sectional radius in order to permit detection of the RFID tags by positioning said at least one RFID sensor proximate to an exterior surface of the second section of the closed piping; and
    determining a flow rate of the material through the closed piping based on the RFID tag passage rate and the known concentration of RFID tags in the material.

9. A system comprising:
    a processor;
    a memory coupled to the processor; and
    a Radio Frequency Identification (RFID) sensor coupled to processor, wherein the RFID sensor is enabled to detect multiple RFID tags that are suspended unadhered to a laced material, wherein the multiple RFID tags are distributed through the laced material in a known concentration;

wherein the processor and the RFID sensor detect and count multiple Radio Frequency Identification (RFID) tags that pass a specific location in a piping per a unit of time, wherein the processor is enabled to calculate an RFID tag passage rate based on a count of RFID tags that pass the specific location in the piping per the unit of time, and wherein the process is enabled to calculate a flow rate of the laced material through the piping based on the RFID tag passage rate and the known concentration of RFID tags in the laced material, and wherein the RFID tags are detected and counted by positioning the RFID sensor adjacent to the piping, where the RFID tags have a limited detection range that is less than a cross-sectional radius of a first section of the piping, and where a second section of the piping has a smaller cross-sectional radius in order to permit detection of the RFID tags by positioning said RFID sensor proximate to an exterior surface of the second section of the piping.

10. The system of claim 9, wherein the laced material is composed of dry particulates.

11. The system of claim 9, wherein the laced material remains within the piping while the multiple RFID tags are detected and counted.

12. The system of claim 11, wherein the laced material is a hazardous material.

13. The method of claim 9, wherein the multiple RFID tags identify a composition of the laced material.

* * * * *